(12) United States Patent
Cassidy

(10) Patent No.: US 12,716,775 B2
(45) Date of Patent: Aug. 25, 2026

(54) SYSTEM AND METHOD FOR PROVIDING AUTHENTICATED HISTORICAL ARCHITECTURAL PAINT COLORS

(71) Applicant: Michael Drew Cassidy, Decatur, GA (US)

(72) Inventor: Michael Drew Cassidy, Decatur, GA (US)

( * ) Notice: Subject to any disclaimer, the term of this patent is extended or adjusted under 35 U.S.C. 154(b) by 219 days.

(21) Appl. No.: 18/747,997

(22) Filed: Jun. 19, 2024

(65) Prior Publication Data

US 2025/0389586 A1 Dec. 25, 2025

(51) Int. Cl.
*G01J 3/46* (2006.01)
*G06Q 30/0601* (2023.01)

(52) U.S. Cl.
CPC .......... *G01J 3/463* (2013.01); *G06Q 30/0603* (2013.01); *G01J 2003/467* (2013.01)

(58) Field of Classification Search
CPC . G01J 3/463; G01J 2003/467; G06Q 30/0603
See application file for complete search history.

(56) References Cited

U.S. PATENT DOCUMENTS

2006/0012810 A1* 1/2006 Postle ........................ G01J 3/46 358/1.9
2006/0215195 A1* 9/2006 Chan ......................... G01J 3/46 358/1.9
2012/0170840 A1* 7/2012 Caruso .................... G06F 3/048 382/165
2015/0120492 A1* 4/2015 Somerville ........ G06Q 30/0631 705/26.5
2018/0126342 A1* 5/2018 Kent .................... A45D 34/042
2019/0239752 A1* 8/2019 Dumitrescu ......... A61B 5/7264
2021/0201513 A1* 7/2021 Steenhoek ............ G01J 3/0272

* cited by examiner

*Primary Examiner* — Tarifur R Chowdhury
*Assistant Examiner* — Akbar H. Rizvi

(57) ABSTRACT

A system and method for accurately reproducing historical architectural paint colors comprises a database storing a digital collection of authenticated paint color source materials, a spectrometer device for analyzing color paint chips to determine digital color profiles, and a computer processor for converting the digital color profiles into paint color formulas. A paint production system produces paint batches and color samples according to the paint color formulas, and a controlled regional distribution system exclusively distributes the color samples within predefined geographical territories. The method involves maintaining the collection of source materials, receiving client selections, determining digital color profiles, converting them into paint color formulas, producing paint batches and samples, and distributing them in a controlled manner. The invention ensures an unmatched level of historical accuracy and consistency in reproducing architectural paint colors.

17 Claims, 2 Drawing Sheets

SYSTEM AND METHOD FOR PROVIDING AUTHENTICATED HISTORICAL ARCHITECTURAL PAINT COLORS

BACKGROUND

The present invention relates to the field of architectural paint colors, specifically to a system and method for providing authenticated historical paint colors based on original source materials.

Accurate representation and replication of historical architectural paint colors have long been a challenge in the industry. While major paint manufacturers provide historical color charts and palettes, the authenticity of these colors is often questionable. Tania Alam's thesis from Columbia University highlighted the discrepancies and lack of reliable sources for the historical colors offered by paint companies. These inaccuracies stem from factors such as colors being formulated years ago without proper documentation, the addition of new colors to existing palettes over time, and the inability to trace the origins and production dates of the historical color samples.

Current practices in the industry involve consumers relying on printed brochures, sample quarts, or small painted samples to select historical colors. However, these methods fail to provide an accurate representation of the final paint product, often requiring consumers to visit multiple locations or stores to obtain the desired historical color in the correct sheen and formulation.

Furthermore, inconsistencies exist when consumers attempt to purchase historical colors across different US geographical locations. Paint stores in the United States who rely on tint machines and spectrometers require frequent calibration, often once a week or month. This calibration process can lead to variations in color across different stores, even within the same region or state, resulting in the same color formulation appearing slightly different depending on the location where it is mixed.

Prior art, such as the paint colorant product and method disclosed in U.S. Pat. No. 6,740,154, addresses the issue of creating neutral paint colorants by blending colorants with a paint base to achieve a chroma substantially equal to zero. However, this prior art does not specifically address the challenges of accurately replicating historical architectural paint colors or leveraging an extensive collection of original source materials for authentication.

The present invention aims to address these challenges and limitations by utilizing the largest private collection of architectural paint-related material in the United States, comprising over 80,000 books, catalogs, brochures, and original color samples dating back to 1860. This extensive collection serves as an unparalleled source of authentic historical paint color information, providing clients with an unprecedented level of accuracy and authenticity when it comes to historical paint colors.

The core novelty of this invention lies in its ability to provide clients with accurate historical architectural paint color products and consultations based directly on original source materials from the collection. Clients can precisely select a desired historical time period or year and compare color representations across multiple original sources from various paint manufacturers. This tailored and accurate approach, referencing actual color recommendations provided by manufacturers for specific architectural styles and time periods, sets this invention apart from the generalized historical color charts offered by paint companies.

Furthermore, the invention introduces a controlled process for producing and locally distributing historical paint color products and samples. A controlled paint batch is created by either utilizing an on-site spectrometer analysis of the original color chip or by calibrating a local paint store's tint machine to precisely match the selected historical color. From this controlled batch, various sample formats are produced and distributed locally within a defined geographical area, ensuring consistent color accuracy and preventing variations caused by environmental or geographical factors in other regions.

The invention's unique approach, leveraging an extensive authenticated collection of original sources, controlled local production, and transparent historical color consultations, provides an unmatched level of historical accuracy, customization, and transparency in the architectural paint industry.

SUMMARY

The present invention provides a system and method for accurately reproducing historical architectural paint colors by leveraging an extensive collection of authenticated original source materials. The system comprises a database storing a digital collection of paint catalogs, brochures, and color paint chips originating from various paint manufacturers and corresponding to different historical time periods. A spectrometer device analyzes a selected original color paint chip to determine its digital color profile, which is then converted into a paint color formula by a computer processor executing a software module. The paint color formula is transmitted to a paint production system, where a paint mixing device produces a paint batch according to the formula, and a sample production device creates color samples from the batch. A controlled regional distribution system exclusively distributes the color samples within a predefined geographical territory, ensuring consistent color representation.

The method involves maintaining the collection of authenticated architectural paint-related source materials in a digital database, receiving client selections of historical time periods and original source materials through a graphical user interface, determining the digital color profile of the desired paint color using a spectrometer device, converting the color profile into a paint color formula, and producing a paint batch and color samples using an automated paint production system. The color samples are then distributed exclusively within a predefined geographical territory, and authenticated color samples or final paint products are delivered to the client.

The invention addresses the challenges of accurately replicating historical architectural paint colors by utilizing an extensive collection of original source materials for authentication, introducing a controlled process for producing and locally distributing paint color products and samples, and providing transparent historical color consultations. This unique approach ensures an unmatched level of historical accuracy, customization, and consistency in the architectural paint industry.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth hereinafter.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1:
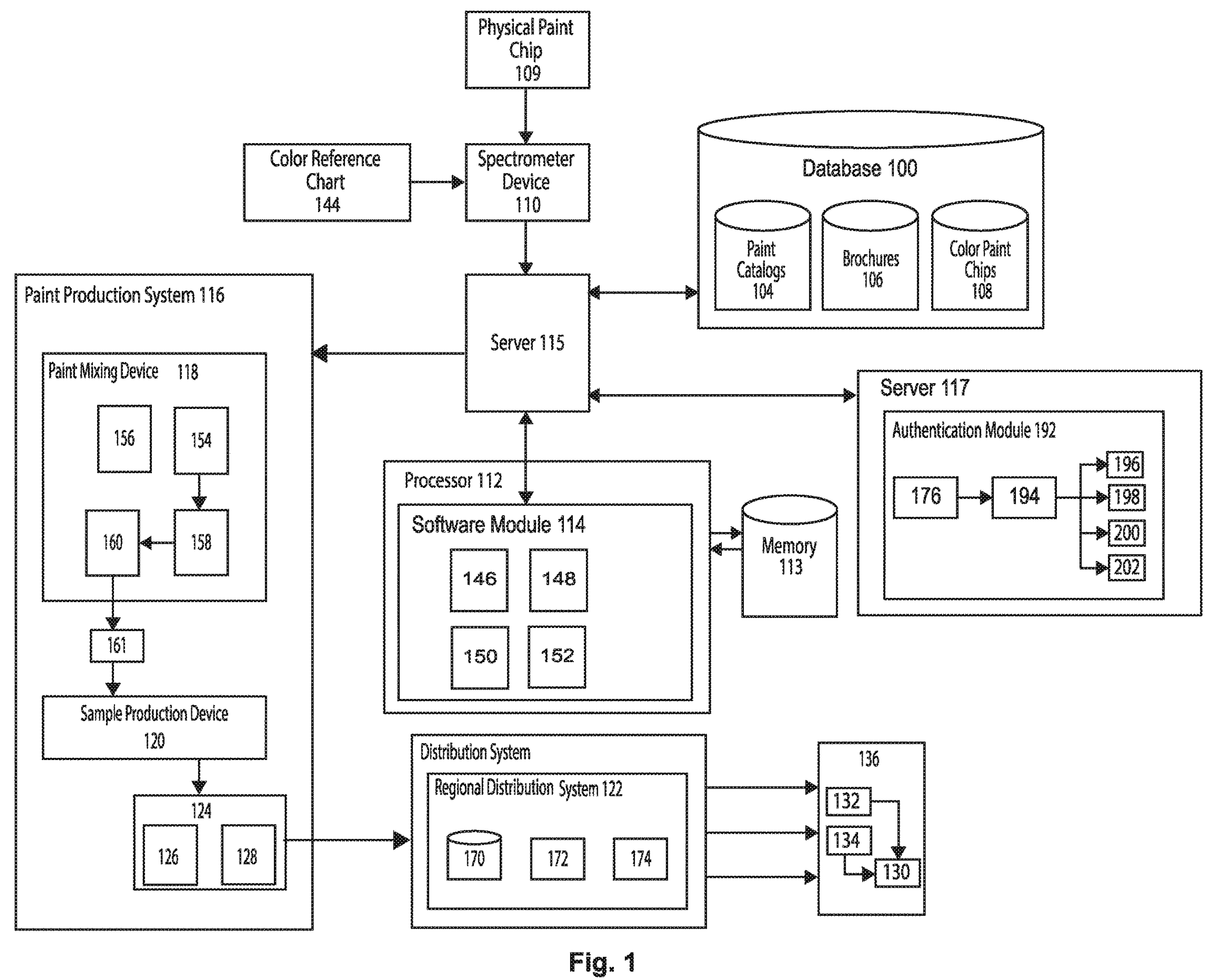
FIG. 1 is a comprehensive system diagram illustrating the key components and their interactions.

In the following detailed description of the preferred embodiments, reference is made to the accompanying drawings, which form a part hereof and show, by way of illustration, specific embodiments in which the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

The following description is provided as an enabling teaching of the present systems, and/or methods in its best, currently known aspect. To this end, those skilled in the relevant art will recognize and appreciate that many changes can be made to the various aspects of the present systems described herein, while still obtaining the beneficial results of the present disclosure. It will also be apparent that some of the desired benefits of the present disclosure can be obtained by selecting some of the features of the present disclosure without utilizing other features.

Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

The terms "a" and "an" and "the" and similar references used in the context of describing a particular embodiment of the present invention (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein.

All systems described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application. Thus, for example, reference to "an element" can include two or more such elements unless the context indicates otherwise.

As used herein, the terms "optional" or "optionally" mean that the subsequently described event or circumstance can or cannot occur, and that the description includes instances where said event or circumstance occurs and instances where it does not.

The word or as used herein means any one member of a particular list and also includes any combination of members of that list. Further, one should note that conditional language, such as, among others, "can," "could," "might", or "may" unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

FIG. 1 is a comprehensive system diagram illustrating the key components and their interactions for providing accurate historical architectural paint color samples.

The system revolves around a central database (100) that houses a curated digital collection of authenticated original architectural paint-related source materials. These materials encompass paint catalogs (104), brochures (106), and color paint chips (108) sourced from various paint manufacturers across different historical periods. The database (100) is built using a robust relational database management system (RDBMS) such as MySQL, PostgreSQL, or Oracle, ensuring efficient storage, retrieval, and management of the digital assets.

To accurately capture the color information from the physical paint chips (108), the system employs advanced color measurement devices. A spectrometer device (110), which can be a portable spectrometer, benchtop spectrometer, or hyperspectral imaging system, is used to analyze the selected original color paint chip (109) and generate a precise digital color profile. The spectrometer device (110) is regularly calibrated using a standardized color reference chart (144) to maintain color measurement accuracy and consistency. The color measurement data is transmitted to the central database (100) via a server (115) using secure network protocols such as HTTPS or SFTP.

At the heart of the system is a powerful computer processor (112) coupled to a memory (113), running a dedicated software module (114). This module, developed using programming languages such as Python, Java, or C++, is responsible for processing the digital color profile received from the spectrometer device (110) via the server (115). It employs sophisticated color matching algorithms (146), such as the Delta E formula (148), color appearance models (150) like CIECAM02 or CAM16, or spectral reconstruction algorithms (152), to convert the digital color profile into an accurate paint color formula. The software module (114) then communicates the paint color formula to the paint production system (116) through the server (115) using industry-standard data exchange formats like JSON or XML over secure API endpoints.

The paint production system (116) consists of two key components: a paint mixing device (118) and a sample production device (120). The paint mixing device (118) is a state-of-the-art computerized color matching system equipped with an array of base paint colorants (156), a precision dispensing mechanism (158), and a high-speed mixing apparatus (160). The dispensing mechanism (158), controlled by a programmable logic controller (PLC) (154), accurately dispenses the required amounts of base paint colorants according to the paint color formula received from the software module (114) via the server (115). The mixing apparatus (160) then homogeneously blends the dispensed colorants to produce a consistent paint batch (161).

The sample production device (120) is responsible for creating a variety of color samples (124) from the prepared paint batch. These samples can take various forms comprising color cards printed using a high-resolution color card printer, precisely cut color chips produced by a dedicated color chip cutting machine, or meticulously coated color boards created using a specialized paint board coating apparatus. Each color sample (124) is assigned a unique identification code, such as a QR code or RFID tag, which links it to the specific paint batch and the original color paint chip (108) used for color matching. This identification system ensures traceability and authenticity of the color samples.

To maintain the integrity and exclusivity of the color samples (124), the system incorporates a controlled regional distribution system (122). This system is designed to distribute the color samples (124) exclusively to authorized recipients, such as clients (130), paint stores (132), or authorized sales representatives (134), within a predefined geographical territory. The controlled regional distribution system (122) leverages a secure database of authorized recipients (170), a comprehensive tracking system (172) utilizing GPS and geofencing technologies to monitor the distribution and use of the color samples (124), and a robust digital rights management system (174) employing encryption and watermarking techniques to enforce strict restrictions on the sale and use of the color samples (124) outside the designated geographical territory.

To further ensure the authenticity of the original architectural paint-related source materials, the system includes an advanced authentication module (192). This module hosted on an alternate server (117) analyzes high-resolution scans (176) of the original source materials using sophisticated image processing techniques (194) such as optical character recognition (OCR), pattern recognition, and machine learning algorithms. It extracts unique identifying features (196) like watermarks (198), signatures (200), or distinct printing patterns (202) and compares them against a comprehensive database of known authentic source materials (100). The server (115) facilitates the communication between the authentication module (192) and the central database (100) to enable efficient comparison and verification of the source materials. This rigorous authentication process guarantees the genuineness of the original source materials used for color matching.

In an additional embodiment, the paint production system (116) is configured to produce a larger paint batch, such as a gallon, from the paint color formula received from the software module (114) via the server (115). This larger paint batch can yield between 400 to 600 square feet of color samples (124), including color cards (126) and color boards (128). The authorized recipients, such as paint stores (132) or sales representatives (134), who receive the initial color samples (124) through the controlled regional distribution system (122), can then use the remaining paint from the larger batch to create additional color samples as needed for their clients (130) within the designated geographical territory (136). This approach ensures that the authorized recipients have a sufficient supply of the historically accurate paint color to meet the demands of their clients without compromising the exclusivity and authenticity of the color samples. The unique identification code assigned to each color sample (124) allows for traceability back to the specific larger paint batch and the original color paint chip (108) used for color matching, maintaining the integrity of the system.

Figure 2:
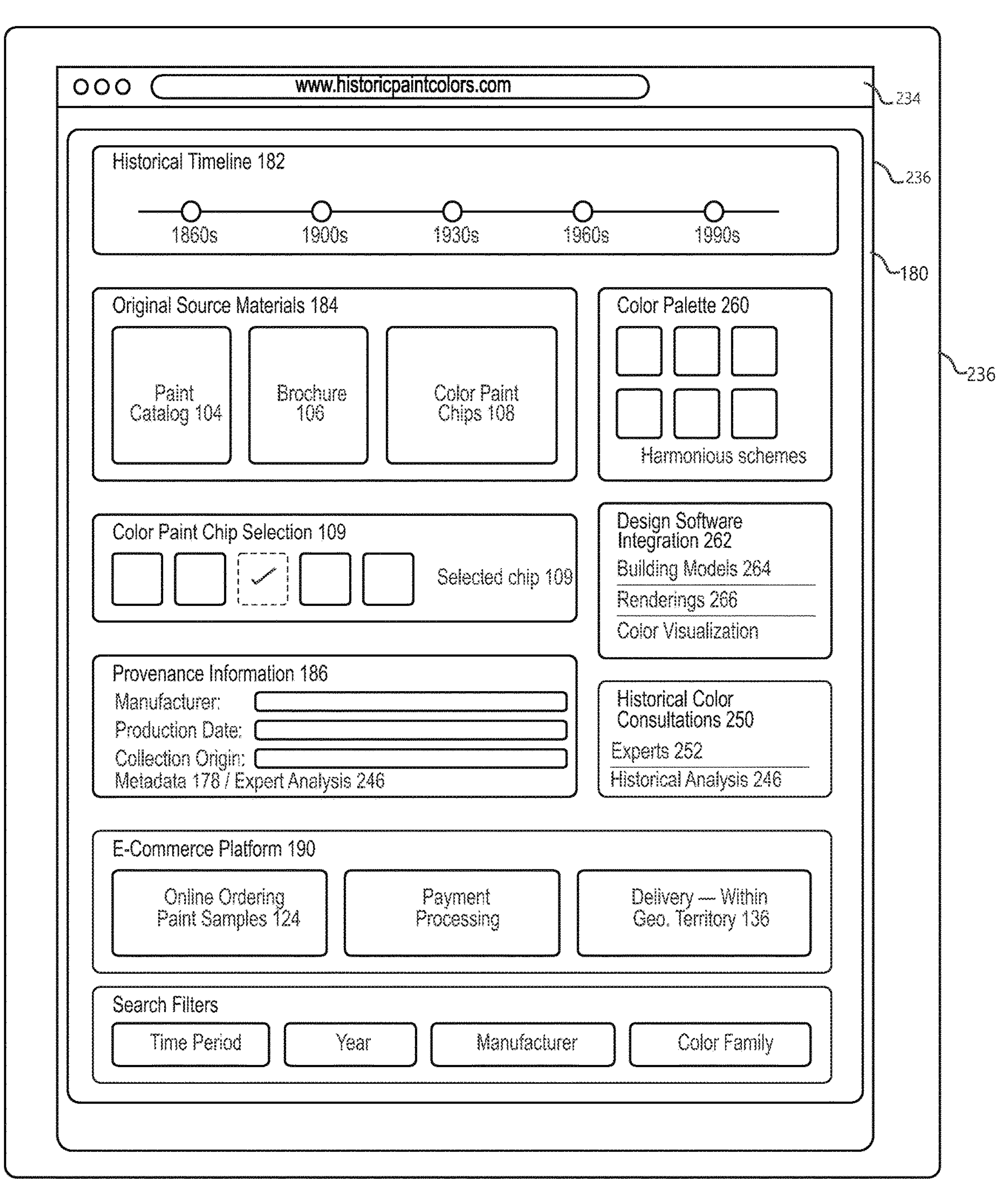
FIG. 2 is a schematic diagram illustrating an exemplary graphical user interface for interacting with the system.

FIG. 2 is a schematic diagram illustrating an exemplary graphical user interface (180) for interacting with the system for reproducing historically accurate architectural paint colors. The graphical user interface (180) provides an intuitive and user-friendly means for clients (130) to explore, select, and order paint colors and samples based on authenticated historical source materials.

The graphical user interface (180) displays a timeline of historical time periods (182) that clients can select to view relevant paint color information from a specific era. Upon selecting a time period, the interface presents a digitized version of the original source materials (184) corresponding to the selected period, such as high-resolution scans (176) of paint catalogs (104), brochures (106), or color paint chips (108). These digitized materials are retrieved from the digital collection stored in the database (100).

Clients can browse through the digitized source materials (184) and select a specific original color paint chip (108) that interests them. When a paint chip is selected, the graphical user interface (180) displays the associated provenance information (186), including details about the historical context, origin, and authenticity of the color. This provenance information is derived from metadata (178) and expert analysis (246) of the original source materials.

To aid in color selection and coordination, the graphical user interface (180) provides a preview of color palettes and harmonious color schemes (260) generated based on the client's selected paint chip and historical time period. These color palettes are digitally generated by analyzing the color relationships and aesthetics of the original source materials using image processing techniques (194) and color matching algorithms (146).

The graphical user interface (180) also offers integration with third-party architectural design software (262), allowing clients to visualize and apply the historically accurate paint colors to digital building models (264) or renderings (266). This integration enables clients to see how the selected paint colors would look in the context of their specific architectural projects.

Other features of the graphical user interface (180) include the ability to save and compare multiple color selections, access to historical color consultations (250) with experts (252) knowledgeable about the paint colors and their historical context, and an e-commerce platform (190) for ordering paint samples (124) or custom color-matched paint.

The graphical user interface (180) is a key component of the system, serving as the primary point of interaction for clients (130) to explore, select, and order historically accurate architectural paint colors. It leverages the digital collection, image processing techniques (194), color matching algorithms (146), and expert knowledge to provide a comprehensive and user-friendly experience for accessing and utilizing the authentic historical paint color information.

In some embodiments, the graphical user interface (180) is implemented as a web-based application (232) accessible via a web browser (234) on a client device (236). The web-based application is developed using modern front-end technologies such as HTML5, CSS3, and JavaScript frameworks like React or Angular. These technologies enable the creation of responsive, interactive, and visually appealing user interfaces that can be accessed across a wide range of devices, including desktop computers, laptops, tablets, and smartphones. The use of web standards ensures cross-platform compatibility and ease of maintenance, while the implementation of modular and reusable components streamlines the development process and allows for efficient updates and enhancements to the graphical user interface (180) as the system evolves over time.

The embodiments described herein are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

The following are examples of variations:

The method, wherein the original source materials are digitized using a high-resolution scanner or camera to capture color and texture details, and the digital files are stored in the digital database with associated metadata.

The method, further comprising:

generating, by the computer processor, a digital color palette comprising harmonious color schemes based on the client-selected original source material and historical time period; and displaying the digital color palette on the graphical user interface for client review and selection.

The method, further comprising:

integrating the paint color formula with third-party architectural design software to allow clients to visualize and apply the historically accurate paint color to digital building models or renderings.

The method, wherein the spectrometer device used to determine the digital color profile is selected from a group consisting of a portable spectrometer, a benchtop spectrometer, and a hyperspectral imaging system, and wherein the spectrometer device is calibrated using a standardized color reference chart.

The method, wherein converting the digital color profile into the paint color formula employs a color matching algorithm selected from a group consisting of a Delta E formula, a color appearance model, and a spectral reconstruction algorithm.

The method, wherein the paint mixing device in the automated paint production system is a computerized color matching system comprising:

a plurality of base paint colorants;

a dispensing mechanism for dispensing precise amounts of the base paint colorants according to the paint color formula; and a mixing apparatus for homogeneously mixing the dispensed base paint colorants to produce the paint batch.

The method, wherein the sample production device is selected from a group consisting of a color card printer, a color chip cutting machine, and a paint board coating apparatus, and wherein each color sample includes a unique identification code linking it to the specific paint batch and original color paint chip.

The method, wherein restricting the sale and use of the color samples within the predefined geographical territory comprises:

maintaining a database of authorized recipients within the predefined geographical territory; tracking the distribution and use of the color samples; and enforcing restrictions on the sale and use of the color samples outside the predefined geographical territory using a digital rights management system.

The method, wherein the paint color formula transmitted to the automated paint production system includes a list of base paint colorants and their respective proportions required to reproduce the desired architectural paint color, as well as any additional additives or processing instructions specific to the historical time period.

The method further comprising:

facilitating online ordering, payment, and delivery of the color samples and reproduced paint products exclusively within the predefined geographical territory using an e-commerce platform integrated with the digital database and the automated paint production system.

What is claimed is:

1. A system for providing accurate historical architectural paint color samples, comprising:

a database storing a digital collection of authenticated original architectural paint-related source materials, including paint catalogs, brochures, and color paint chips originating from a plurality of paint manufacturers, the source materials corresponding to a plurality of historical time periods;

a spectrometer device configured to analyze a selected original color paint chip from the collection to determine a digital color profile of the color of the paint chip;

a computer processor; and a memory coupled to the processor, the memory storing instructions that, when executed by the processor, cause the system to:

receive the digital color profile from the spectrometer device;

convert the digital color profile into a paint color formula for reproducing the color of the paint chip; and transmit the paint color formula to a paint production system; and an authentication module configured to: analyze high-resolution scans of the source materials using image processing techniques; extract unique identifying features comprising at least one of watermarks, signatures, and printing patterns; and compare the extracted features against the database to verify the authenticity of the original architectural paint-related source materials, wherein the paint production system comprises:

a paint mixing device configured to produce a paint batch according to the paint color formula, thereby reproducing the color of the selected original paint chip; and a sample production device configured to produce a plurality of color samples from the paint batch, the color samples comprising at least one of a color card, a color chip, and a color board; and a controlled regional distribution system configured to:

distribute the plurality of color samples exclusively to at least one of a client, a paint store, and an authorized sales representative located within a predefined geographical territory; and restrict the sale and use of the plurality of color samples to within the predefined geographical territory, thereby ensuring consistent color representation within the predefined geographical territory, wherein the controlled regional distribution system comprises:

a secure database of authorized recipients;

a tracking system utilizing GPS and geofencing technologies to monitor distribution and use of the plurality of color samples; and a digital rights management system employing encryption and watermarking techniques to enforce restrictions on sale and use of the plurality of color samples outside the predefined geographical territory.

2. The system of claim 1, wherein the spectrometer device is selected from a group consisting of a portable spectrometer, a benchtop spectrometer, and a hyperspectral imaging system, and wherein the spectrometer device is calibrated using a standardized color reference chart.

3. The system of claim 1, wherein the instructions executed by the computer processor employ a color matching algorithm selected from a group consisting of a Delta E formula, a color appearance model, and a spectral reconstruction algorithm, to convert the digital color profile into the paint color formula.

4. The system of claim 1, wherein the paint mixing device in the paint production system is a computerized color matching system comprising:
- a plurality of base paint colorants;
- a dispensing mechanism for dispensing precise amounts of the base paint colorants according to the paint color formula; and
- a mixing apparatus for homogeneously mixing the dispensed base paint colorants to produce the paint batch.

5. The system of claim 1, wherein the sample production device is selected from a group consisting of a color card printer, a color chip cutting machine, and a paint board coating apparatus, wherein each color sample includes a unique identification code linking it to the specific paint batch and original color paint chip.

6. The system of claim 1, wherein the digital collection of authenticated original architectural paint-related source materials includes high-resolution scans of paint catalogs, brochures, and color paint chips, each associated with metadata indicating the manufacturer, production date, and collection origin.

7. The system of claim 1, further comprising a graphical user interface configured to:
- display a timeline of historical time periods for client selection;
- present a digitized version of the original source materials corresponding to the selected time period;
- allow the client to select a specific original color paint chip from the presented source materials; and
- display provenance information associated with the selected original color paint chip.

8. The system of claim 1, wherein the paint color formula transmitted to the paint production system includes a list of base paint colorants and their respective proportions required to reproduce the color of the selected original paint chip, as well as any additional additives or processing instructions specific to the historical time period.

9. The system of claim 1, wherein the controlled regional distribution system further comprises an e-commerce platform for facilitating online ordering, payment, and delivery of the color samples and reproduced paint products exclusively within the predefined geographical territory.

10. A computer-implemented method for providing authenticated historical architectural paint colors, comprising:
- maintaining, in a digital database, a collection of architectural paint-related source materials, the collection comprising a plurality of authenticated original source materials originating from a plurality of paint manufacturers, the original source materials including paint catalogs, brochures, and color paint chips corresponding to a plurality of historical time periods;
- receiving, via a graphical user interface, a client selection of at least one of a historical time period and a year for a desired architectural paint color;
- querying the digital database to identify a plurality of original source materials corresponding to the client selection;
- displaying, via the graphical user interface, the identified plurality of original source materials;
- receiving, via the graphical user interface, a client selection of an original source material from the displayed plurality of original source materials;
- retrieving, from the digital database, provenance information for the client-selected original source material, the provenance information including at least one of a production date, a manufacturer, and a collection origin of the original source material;
- determining a digital color profile of the desired architectural paint color using a spectrometer device to analyze a color paint chip from the client-selected original source material;
- converting, by a computer processor, the digital color profile into a paint color formula for reproducing the desired architectural paint color;
- transmitting the paint color formula to an automated paint production system;
- producing, by the automated paint production system, a paint batch according to the paint color formula;
- producing, by an automated sample production system, a plurality of color samples from the paint batch;
- distributing the plurality of color samples exclusively within a predefined geographical territory; and
- delivering at least one of an authenticated color sample and a final paint product to the client.

11. The method of claim 10, wherein the automated paint production system comprises:
- a paint mixing device configured to dispense and mix paint base colors and tints according to the paint color formula; and
- a sample production device configured to apply the mixed paint onto a substrate to produce color samples in the form of color cards or color boards.

12. The method of claim 10, further comprising:
- performing, by the automated paint production system, a quality control analysis on the paint batch to verify color accuracy within a predetermined tolerance range before producing the color samples.

13. The method of claim 10, wherein the collection of architectural paint-related source materials further comprises:
- authenticated historical documents, marketing materials, and product information related to architectural paint colors and trends.

14. The method of claim 10, wherein the graphical user interface is a web-based application accessible via a web browser on a client device, the web-based application configured to:
- display search filters for selecting a historical time period, year, paint manufacturer, or color family;
- provide preview images and descriptions of the original source materials; and
- allow clients to save and compare multiple color selections before making a final selection.

15. The method of claim 10, further comprising:
- verifying the provenance information for the original source materials by comparing the materials to authenticated reference documents, expert analysis, or historical records maintained by the paint manufacturers or independent third-party organizations.

16. The method of claim 10, further comprising:
- providing, via the graphical user interface, access to historical color consultations with experts knowledgeable about the collection of architectural paint-related source materials and the historical context of the paint colors.

17. The method of claim 10, further comprising:

analyzing the high-resolution digital files of the original source materials using image processing techniques to extract unique identifying features, comprising at least one of watermarks, signatures, and printing patterns; and comparing the extracted features against a database of known authentic source materials to verify the authenticity of the original architectural paint-related source materials.

* * * * *